United States Patent [19]
Kokta et al.

[11] Patent Number: 5,982,796
[45] Date of Patent: Nov. 9, 1999

[54] 2.7 µM LASER CRYSTALLINE MATERIAL UTILIZING MULTIPLE-CHANNEL OPTICAL PUMPING

[75] Inventors: Milan Ratislav Kokta, Washougal, Wash.; Ramesh Kumar Shori, Burbank, Calif.

[73] Assignee: Union Carbide Chemicals & Plastics, Danbury, Conn.

[21] Appl. No.: 08/991,471

[22] Filed: Dec. 16, 1997

[51] Int. Cl.$^6$ ...................................................... H01S 3/16
[52] U.S. Cl. ............................................... 372/41; 372/68
[58] Field of Search .................................. 372/41, 68, 70

[56] References Cited

U.S. PATENT DOCUMENTS

| | | | |
|---|---|---|---|
| 5,088,103 | 2/1992 | Esterowitz et al. | 372/68 |
| 5,742,632 | 4/1998 | Barnes et al. | 372/68 |

OTHER PUBLICATIONS

"Q–Switched CTE:YAG (2.69 µm) Laser Ablation: Basic Investigations on Soft (Corneal) and Hard (Dental) Tissues", Kermani et al., *Lasers in Surgery and Medicine* 13:537–542 (1993).

"Spectroscopic Aspects of (Cr, Tm–Er):YAG Active Media", Antipenko et al., *Izvestiya Akademii Nauk SSSR. Seriya Fizicheskaya*, vol. 54, No. 12, pp. 2393–2396 (1990).

"Cr:Tm:Er:TAG laser for medical applications at 2.69 µm", Antipenko et al., *Sov. J. Opt. Technol.* 60 (6) Jun. 1993, pp. 418–419.

"Steady–state emission from a $Y_3Al_5O_{12}:ER^{3+}$laser ($\lambda$=2.94µ, T=300°K)", Bagdasarov et al., *Sov. J. Quantum Electron*, 13(2), Feb. 1983, pp. 262–263.

"Efficient cross–relaxation laser emitting at $\lambda$=2.94µ", Zhekov et al., *Sov. J. Quantum Electron*, 13(9), Sep. 1983, pp. 1235–1237.

"Cooperative phenomena in yttrium erbium aluminum garnet crystals", Zhekov et al., *Sov. J. Quantum Electron*, 14(1), Jan.. 1984, pp. 128–129.

"Yttrium–erbium–aluminum–garnet: A promising news crystal for IR lasers", Bagdasarov et al., *Izvestiya Akademi Nauk SSSR*, Seriya Fizicheskaya, vol. 46, No. 8, 1982, pp. 1496–1503.

"Temperature dependence of a 2.94µm YAG:Er laser and population of the laser levels", Spring et al., *J. Appl. Phys.*, vol. 69, (2), Jan. 15, 1991, pp. 581–583.

"Efficiency of Energy Transfer between $Cr^{3+}$and $TM^{3+}$in Scandium and Aluminum Garnets", Quarles et al., paper presented at NRL seminar, 1988.

"Operation of the High Dopant Density ER:YAG at 2.94µm", Bass et al., paper submitted to Proceedings of Tunable Laser Conference, 1986.

"Multiphonon relaxation in the rare–earth ions doped laser crystals", Basiev et al., General Physics Institute, Moscow, Russia.

"High repetition rate, high average power Er:YAG laset at 2.94µm", Charlton et al., *Journal of Modern Optics*, 1989, vol. 36, No. 10, 1393–1400.

*Primary Examiner*—Leon Scott, Jr.
*Attorney, Agent, or Firm*—Gus T. Hampilos; Volker R. Ulbrich

[57] ABSTRACT

A Cr/Tm/Er-doped, yttrium- or lutetium-garnet host material crystal for a solid-state laser, wherein about 3 to about 8 atomic percent of the yttrium or lutetium, respectively, crystallographic sites are occupied by $Tm^{3+}$ ions, about 7 to about 22 atomic percent of the yttrium or lutetium, respectively, crystallographic sites are occupied by $Er^{3+}$ ions, and about 0.6 to about 1.6 atomic percent of the octahedral sites of the garnet structure are occupied by $Cr^{3+}$ ions, which crystal lases under the influence of a pumping means at a wavelength of no more than about 2.7µ.

14 Claims, 13 Drawing Sheets

2.7 μM LASER CRYSTALLINE MATERIAL UTILIZING MULTIPLE-CHANNEL OPTICAL PUMPING

BACKGROUND OF THE INVENTION

1. Field of the Invention

This invention relates to laser compositions which significantly increase the efficiency of chromium/thulium/erbium-doped garnet lasers and permits improved output at lower wavelengths than previously known for this type of laser.

2. Prior Art

Chromiumlthulium/erbium("CTE")-doped garnet lasers are known in the art and have found utility in a variety of applications. Similarly, the existence of numerous $Er^{3+}$ energy state transitions is well known. In particular, previous workers in the art have learned that lasing at an IR frequency of 2.95μ involves the transition $^4I_{11/2}$ to $^4I_{13/2}$ and Stark levels $X_2$ to $Y_7$. This transition results in reasonably efficient laser action at room temperature when the erbium concentration in the garnet host, preferably YAG, exceeds about 30% of the yttrium sites. However, while the 2.96μ wavelength laser is an excellent tool for medicine and various other applications related to the oxygen-hydrogen bond stretching vibration of water molecules, it has one very serious shortcoming: it cannot be efficiently transferred via common silica fiber. It is advantageous for practical use of lasers to deliver the laser beam via an optical fiber. Most common optical fibers are made from silica, or phosphate glass compounds, but their performance is limited to a maximum wavelength of about 2.8μ. The laser beam with wavelength of 2.95μ must therefore be delivered via sapphire or fluoride fibers, which are not yet perfected and are more costly. A laser operating at about 2.7μ, preferably at room temperature, with sufficient power would offer numerous benefits for most medical applications, as well as the many related applications.

SUMMARY OF THE INVENTION

This invention relates to an improved crystal composition for the $TM^{3+}$ sensitizing of $Er^{3+}$. The present composition creates an enhanced population inversion on $X_1$ Stark level of the $^4I_{11/2}$ energy band of $Er^{3+}$ ion in garnet structure by multi-channel energy transfer from an optical pump to active ion. The above-mentioned population inversion facilitates high power laser action at a nominal 2.7μ. More specifically, the invention comprises a Cr/Tm/Er("CTE")-doped, yttrium- or lutetium-garnet host material crystal for a solid-state laser, wherein about 3 to about 8 atomic percent of the yttrium or lutetium, respectively, crystallographic sites are occupied by $Tm^{3+}$ ions, about 7 to about 22 atomic percent of the yttrium or lutetium, respectively, crystallographic sites are occupied by $Er^{3+}$ ions, and about 0.6 to about 1.6 atomic percent of the octahedral sites of the garnet structure are occupied by $Cr^{3+}$ ions, which crystal lases under the influence of a pumping means at a wavelength of no more than about 2.7μ.

DESCRIPTION OF THE INVENTION

The present invention provides a garnet laser composition doped with chromium, thulium and erbium and preferably pumped with 540 nm to 600 nm flashlamp pumps. This very efficiently exploits the energy transfer from the $^2E$ energy level of chromium to the $^3F_3$ energy level of thulium, as well as the transfer of energy from the $^4T_2$ level of erbium to its $^4F_{9/2}$ level. The energy from the $Tm^{3+}$ $^3F_3$ level is then channeled to the $^3H_4$ level, which is in resonance with the $^4I_{9/2}$ Er energy level, facilitating efficient energy transfer from $Tm^{3+}$ to Er. This transition is followed by nonradiative transfer to $^4I_{11/2}$ lasing energy levels of erbium. In addition, the Er $^4S_{3/2}$ level is pumped, the energy from which transfers to the $^4F_{9/2}$ level, which results in a massive population inversion in the $X_1$ Stark level of the $^4I_{11/2}$. Accordingly, this level is de facto pumped by four channels for maximum utilization of the optical pump energy.

In summary, the present compositions utilize the following pumping channels:

a) $Cr^3$ $(^2E) \rightarrow Tm^{3+}$ $(^3F_3 \rightarrow ^3H_4) \rightarrow Er^{3+}$ $(^4I_{9/2} \rightarrow ^4I_{11/2})$ b) $Cr^{3+}$ $(^4I_2) \rightarrow Er^{3+}$ $(^4F_{4/2} \rightarrow ^4I_{11/2})$ c) Direct $Tm^{3+}$ $(^3F_3 \rightarrow ^3H_4 \rightarrow Er^{3+}$ $(^4I_{9/2} \rightarrow ^4I_{11/2})$ d) Direct $Er^{3+}$ $(^4S_{3/2} + ^4F_{9/2}) \rightarrow ^4I_{11/2})$ $Er^{3+}$ concentration must be maintained below about 22% to limit the lasing for $X_2$ Stark level. The actual Stark level pumped is $X_1$ at 10252 $cm^{-1}$. The massive four-channel pumping combined with minimized absorption loss by using high quality antireflection coatings, operating temperature controls, and $^4I_{13/2}$ level depopulation aided by $Tm^{3+}$ ions, results in the complete shift of output wavelength to 2.7μ at high power density 250 m/J pulse and up to over 1 J/pulse.

Increasing the strength of the crystal field of the host by using a garnet of smaller lattice parameter by replacing the $Y^{3+}$ ions with $Lu^{3+}$ ions, the strength of Cr→Tm→Er transition will significantly increase, allowing even more efficient transfer. The Cr-Tm energy transfer was found to increase with decrease of the garnet crystal lattice parameter.

Figure 11:
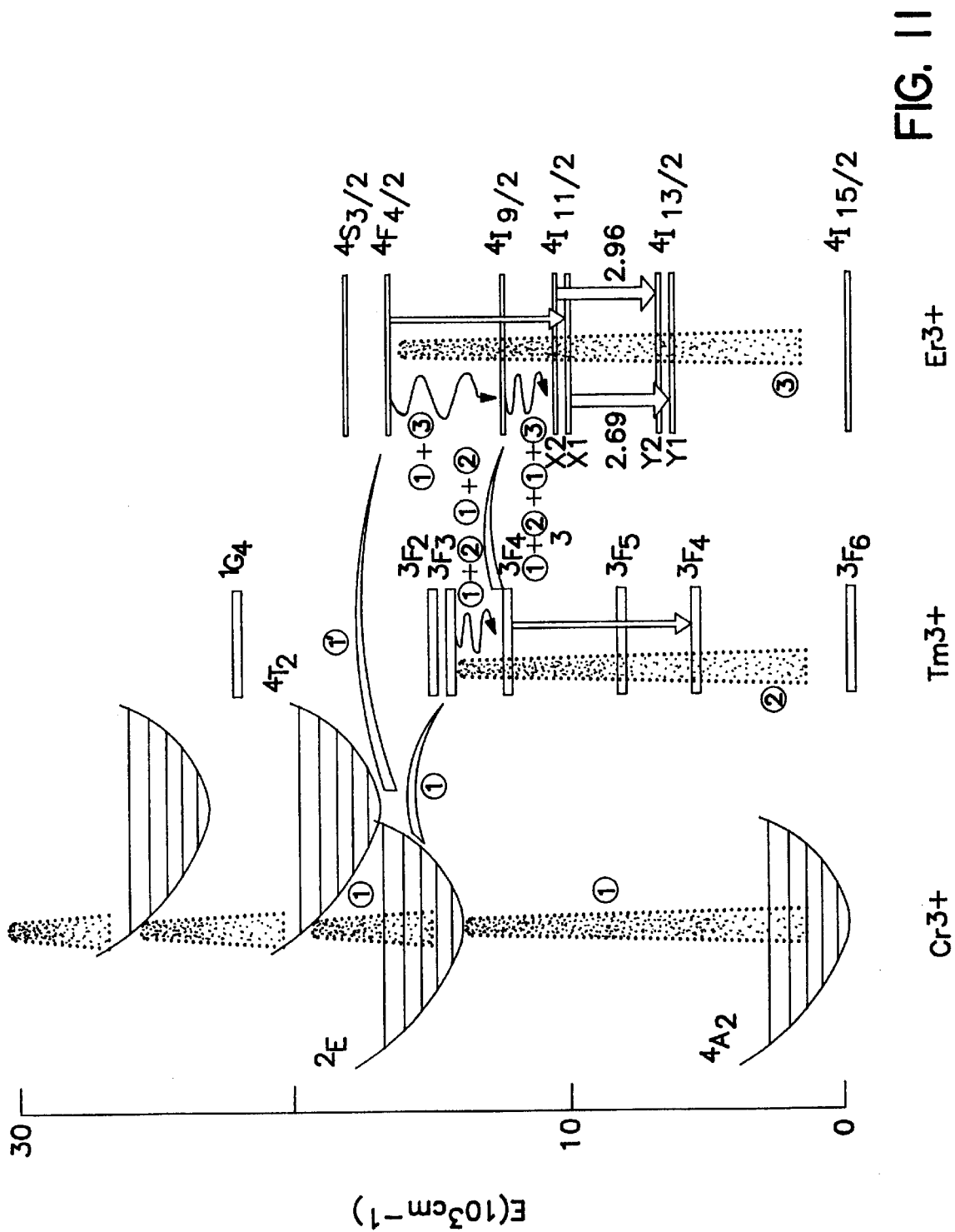
FIGS. 11 and 12 show a Schematic Description of Electronic Transition in CTE:YAG.
Figure 12:
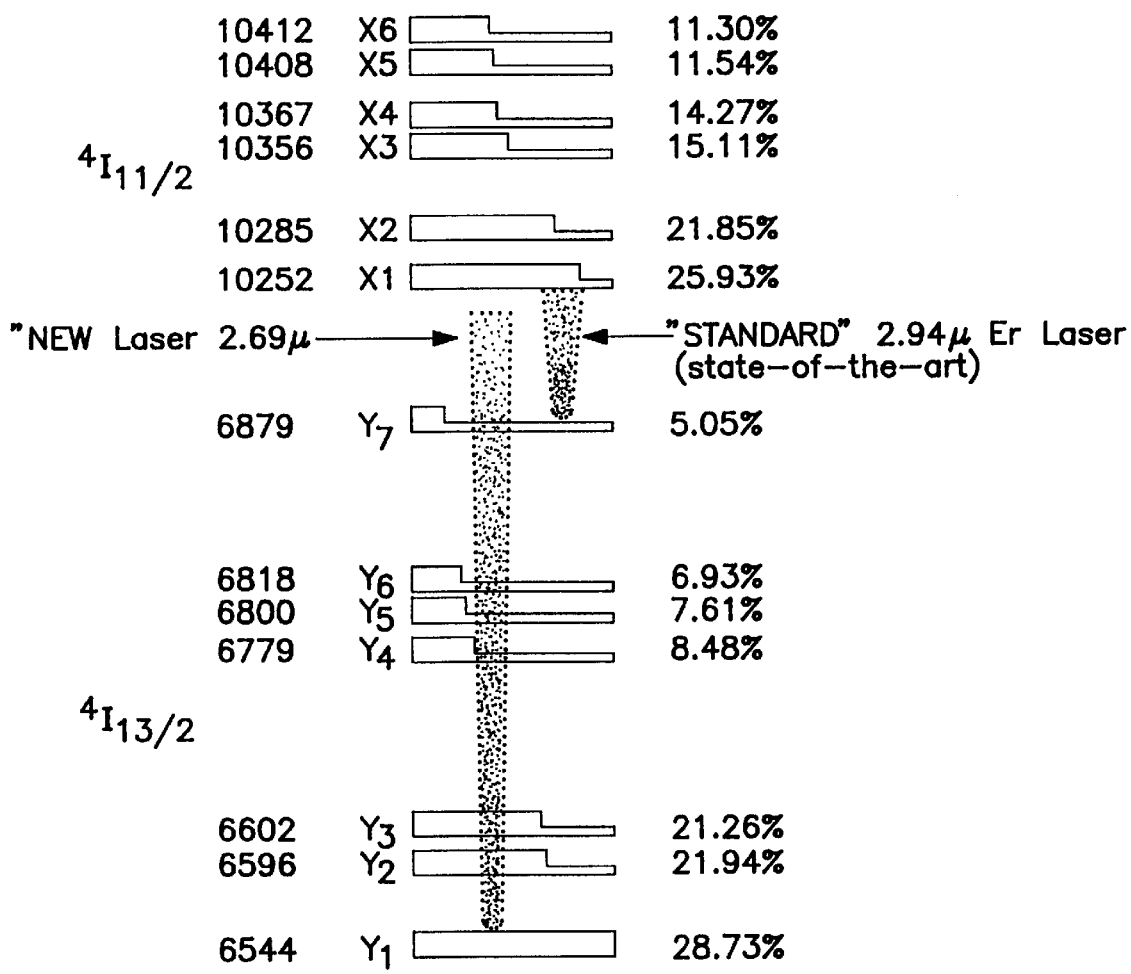

These energy transitions are depicted in FIGS. 11 and 12. FIG. 12 in particular illustrates the dramatic difference between Stark levels involved in the standard laser of the prior art (at 2.94μ) and that of the present invention (at 2.69μ).

Thus it is seen that by proper selection of concentrations of particular dopants, the instant invention optimizes the processes of exciting and cross-relaxation so as to maximize the lasing output at the $^4I_{3/2}$ energy level of $Er^{3+}$. This results in highly efficient lasing at desirable wavelengths of less than 2.8 μm.

The present invention further provides a solid-state laser comprising the doped garnet crystal as described above and pumped by means of a standard xenon flashlamp.

Accordingly, the present invention provides a laser wherein said $Cr^{3+}$, $Tm^{3+}$ and $Er^{3+}$ doped laser crystal is responsive to light from said flashlamp means for simultaneously absorbing that light in $^4T_2$ and $^4T_1$ levels of said $Cr^{3+}$ ions, $^3F_3$ level of said $Tm^{3+}$ ions, and $^4F_{4/2}$ level of the $Er^{3+}$ ions, resulting in a nonradiative simultaneous transfer of the excitation from the thermally mixed $^4T_2/^2E$ level of $Cr^{3+}$ to $^3F_3$ levels of said $Tm^{3+}$ ion and $^4F_{9/2}$ levels of $Er^{3+}$ ions, from $^3F_3$ $Tm^{3+}$ level, and the excitation combined with pump energy directly deposited to $^3F_3$ simultaneously relaxes to $^3H_4$ $Tm^{3+}$ level from which the combined energy transfers to $^4I_{9/2}$ level of $Er^{3+}$ ion and this energy from $^4I_{9/2}$ relaxes to $X_2$ level of $^4I_{11/12}$ manifold, and is added to energy transferred from $^4I_{9/2}$ of Er, thus creating a massive population inversion on $X_2$ Stark level enabling the crystal to lase at laser transition from $X_2$ Stark level of $^4I_{11/12}$ level to $Y_1$ Stark level of $^4I_{13/2}$ level of $Er^{3+}$ ion to produce emission over about 50 mJ/pulse at 2.69 microns.

In an alternative embodiment, the laser of this invention may be laser or laser diode-pumped. Diode pumping utilizes pumping light energy in very narrow spectral range, which is directly tuned to absorption levels of active ions which are also narrow; therefore, energy utilization is more efficient and the crystal does not require the presence of a broad band absorber such as $Cr^{3+}$ ion. The crystal of this invention can be pumped by 787 nm diode and 980 nm diode simultaneously to achieve effects similar to flashlamp pumping. Both of these diodes are commercially available and are normally used individually to pump as Nd or Tm crystals.

The preferred laser crystal or rod consists of YAG (yttrium aluminum garnet) or LuAG (lutetium aluminum garnet). These materials have the ability to accept the required concentrations of the dopants of this invention using normal, well-known doping procedures, without distorting the lattice of the host material or otherwise significantly impairing its properties.

As used herein and as understood in the art, the expression "atomic percent . . . occupied by" means the percent of substitution of the $Tm^{3+}$ ions for the yttrium ions in YAG, or the percent of substitution of the $Cr^{3+}$ ions for the aluminum ions and/or lutetium ions in YAG and LuYAG.

As used herein, the term "room temperature" means approximately 4° C. to about 35° C. The preferred temperature range is approximately 4° C. to about 25° C., and the most preferred range is approximately 10° C. to about 18° C.

As used herein, the units "$\mu$" and "$\mu$m" are interchangeable and are used randomly.

While the present invention provides its improved performance even without an antireflective coating, in order to optimize performance, it is desirable to utilize an antireflective coating, preferably centered at about $2.7\mu$.

EXAMPLES

The following examples are intended to illustrate, but in no way limit, the invention.

All crystals were grown using the following general procedure.

The crystals were grown by a pulling technique from iridium crucibles 3" in diameter, 3" tall (crucible size is dictated by desired crystal size), heated by means of Radio Frequency (RF) currents induced via copper coupling coil powered by a 50 kW RF generator with a frequency of 10 KHz. The crucible charges were prepared by mixing pertinent oxides in desired ratios.

The mixture was compacted by means of an isostatic press into 1.5" diameter pellets to ensure adequate crucible loading. The charge was melted and <111> orientation undoped yttrium aluminum garnet seed was immersed in the melt. The seed was connected to a rotation and pulling device (crystal puller). After achieving solid-liquid equilibrium, the crystal growth was started by controlling the input power into the RF coupling unit while rotating the seed at 10 RPM and simultaneously lifting it at a rate of 0.020"/hour. The diameter of the growing crystal was controlled by controlling the crystal weight as a function of growth time using an automated control system. The crystals were grown to 100 mm at a diameter of approximately 30 mm. The optical quality of the crystals was uniformly good, even when the crystals displayed the characteristic "core" common to all aluminum-based garnets grown in <111> orientation.

The laser tests reported below were conducted in a water-cooled, single-lam-pump cavity. This cavity was designed for operation of $Er^{3+}$ doped lasers in free-running long-pulse laser operation, but the flashlamp power supply could be easily modified in order to vary the pulse duration in order to determine optimal operating conditions. The system could be further expanded by adding rotating mirror Q-switching to operate effectively in Q-switched mode. The laser cavity (laser head) was water-cooled to extract the heat generated by the flashlamp operation.

Figure 13:
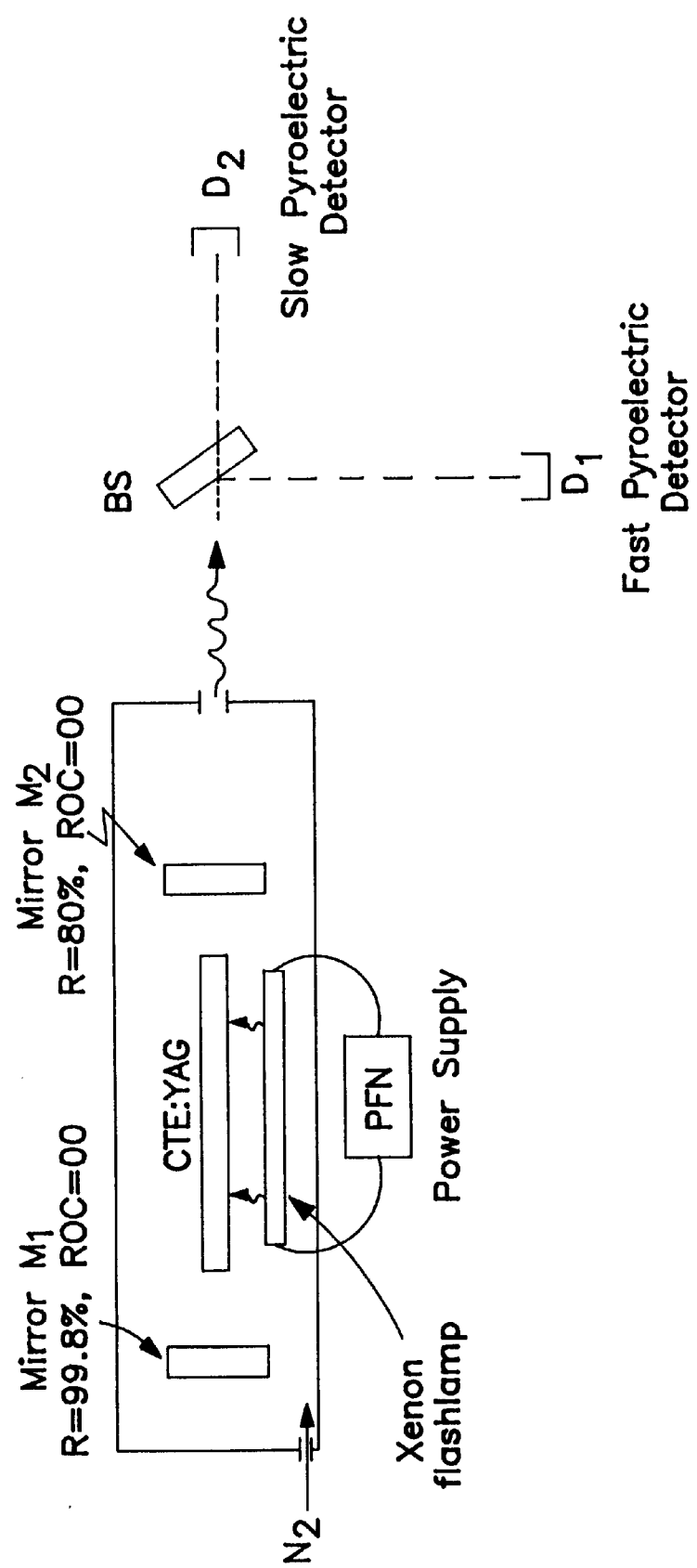
FIG. 13 shows an experimental set up for measuring slope efficiency of CTE:YAG.

More specifically, the experimental set-up used to measure the slope efficiency for the different composition CTE:YAG laser rods is shown in FIG. 13. The cylindrical 5 mm×76 mm laser rod is pumped by a 4-mm bore, 65-mm arc-length xenon flashlamp in a close-coupled specular reflecting cavity. The pump pulse duration was 267 $\mu$s (as measured at 10% height). The input pump energy, $E=0.5CV_{PFN}^2$ where C is the discharge capacitance, was varied from threshold (low pump levels) to 125 J (high pump levels) by adjusting the flashlamp voltage $V_{PFN}$.

The 37-cm long optical resonator consisted of two flat mirrors $M_1$ and $M_2$ with reflectivities $R_1=99.8\%$ and $R_2=80\%$, respectively. The distance between the end face of the laser rod and mirror $M_1$ was 16.5 cm. No intra-cavity aperture was used to force the lasing to occur in the $TEM_{00}$ transerse mode. The cooling water temperature was kept constant at 10° C. To minimize the absorption by atmospheric changes and condensation on the cooled crystal faces, the entire laser chassis was purged with dry nitrogen gas.

The emission spectrum of the laser output was characterized using an eighth-meter monochrometer. The pulse shape and pulse width were measured using a fast pyroelectric detector (rise and fall time approximately 3 ns) and a digital storage oscilloscope. The output energy was measured using a slow pyroelectric detector (Molectron Model J25) and a storage oscilloscope. The threshold energy and the output energy were measured for 2, 4 and 6 Hz repetition rates. Other parameters, such as resonator configuration, laser cavity, and load capacitance were kept constant for all measurements.

The laser rods used in the Examples were fabricated to the same specifications: 5 mm diameter and 76 mm long (except for the rod used in Example 1, which was only 60 mm long; this difference is not considered significant to the results) in flat/flat configuration. Consistency in rod configuration and laser text conditions (pulse duration of 267 $\mu$sec., temperature of operation, values of output couplers, etc.) was strictly maintained in order to be able to make immediate direct comparisons of laser results.

Example 1

The first crystal grown was YAG:1% Cr: 1% Tm: 15% Er. The uncoated rod was pumped with a flashlamp and produced multiple line lasing at various repetition rates, as shown in Table 1.

TABLE 1

| λ (μm) | 2 Hz Operation Output (mJ) | λ (μm) | 4 Hz Operation Output (mJ) |
|---|---|---|---|
| 2.71 | 1.12 | 2.71 | 0.31 |
| 2.83 | 2.8 | 2.83 | 5.94 |
| 2.85 | 3.75 | 2.85 | 0.3 |
| 2.86 | 2.37 | 2.86 | 2.06 |
| 2.94 | 18.75 | 2.94 | 26.4 |
| 2.95 | 91.875 | 2.95 | 36.56 |
| 2.96 | | 2.96 | 26.56 |
| 2.97 | 3.83 | 2.97 | 11.44 |

It will be seen from Table 1 that lasing at the desired wavelength of nominally 2.7μ was extremely weak, and it was concluded that optimizing the crystal composition was more feasible than trying to enhance the 2.7μ portion by laser engineering. The results are shown graphically in FIG. 1.

Figure 1:
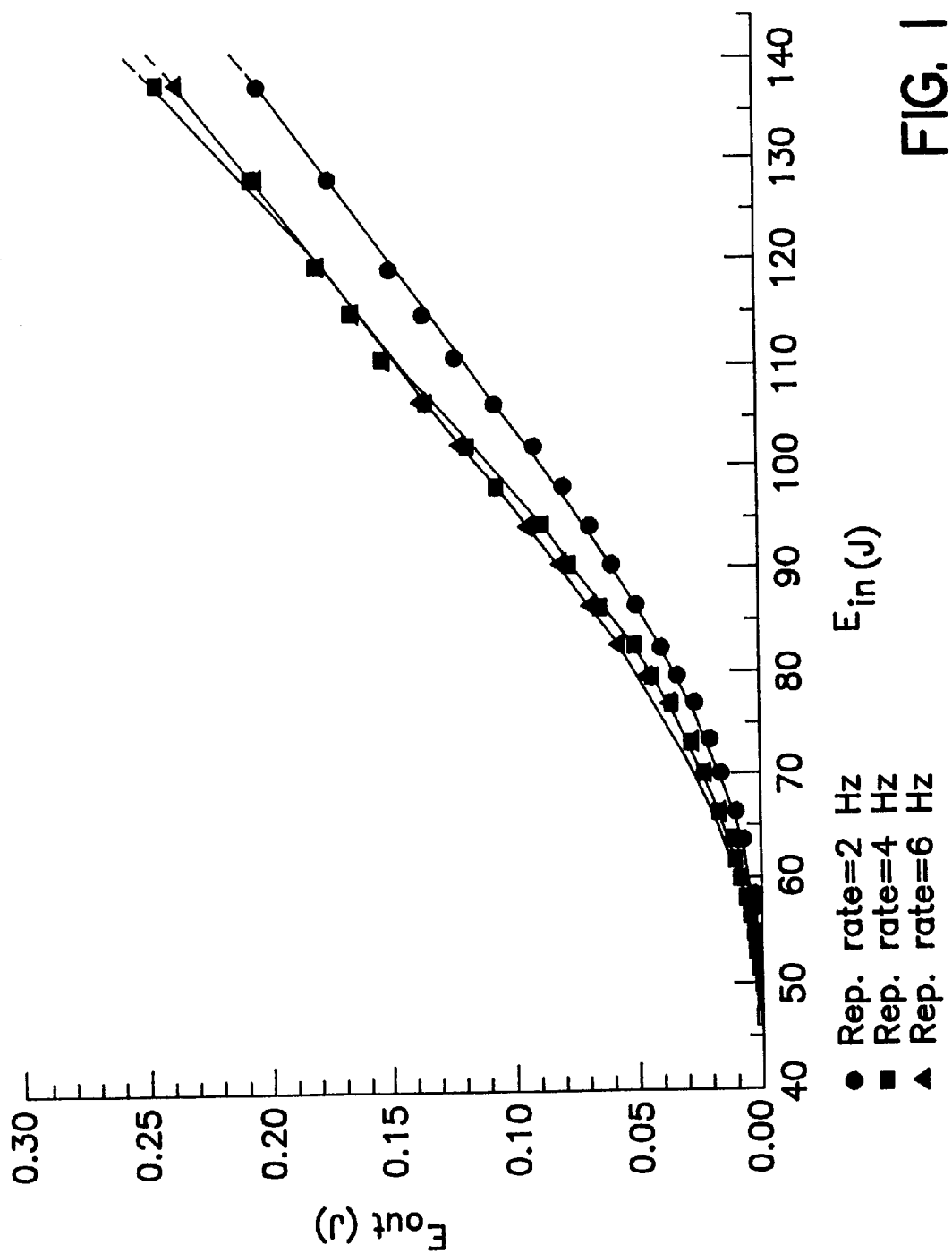
FIG. 1 shows Laser Performance of CTE:YAG: 1% Cr: 1% Tm: 15% Er, Uncoated.
Figure 2:
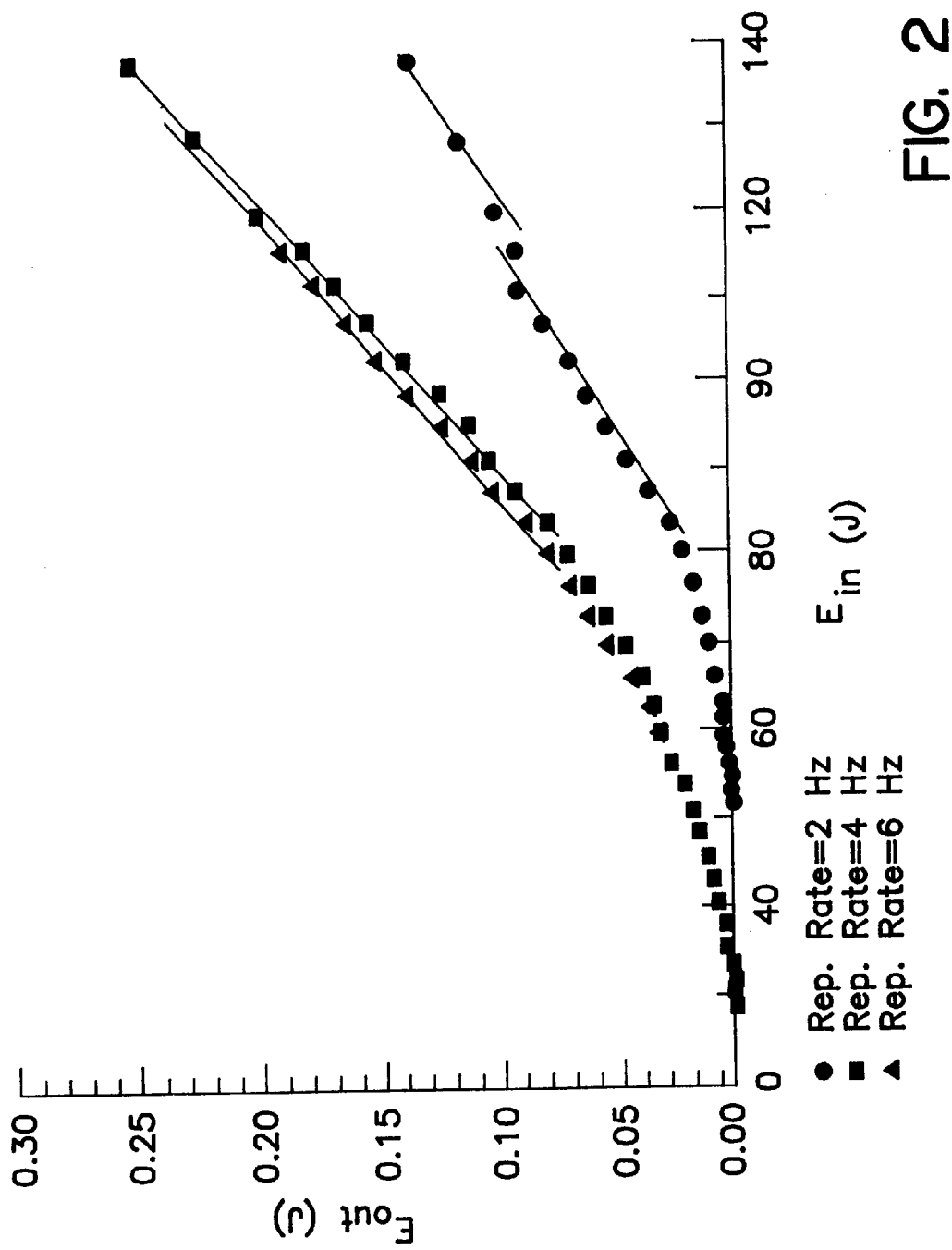
FIG. 2 shows Laser Performance of CTE:YAG: 1% Cr: 1% Tm: 15% Er, Coated.

A rod of the same composition was provided with a typical antireflective coating and tested. The results are shown in FIG. 2. Comparison of the graphs in FIGS. 1 and 2 shows the beneficial effect of the coating.

Example 2

Figure 3:
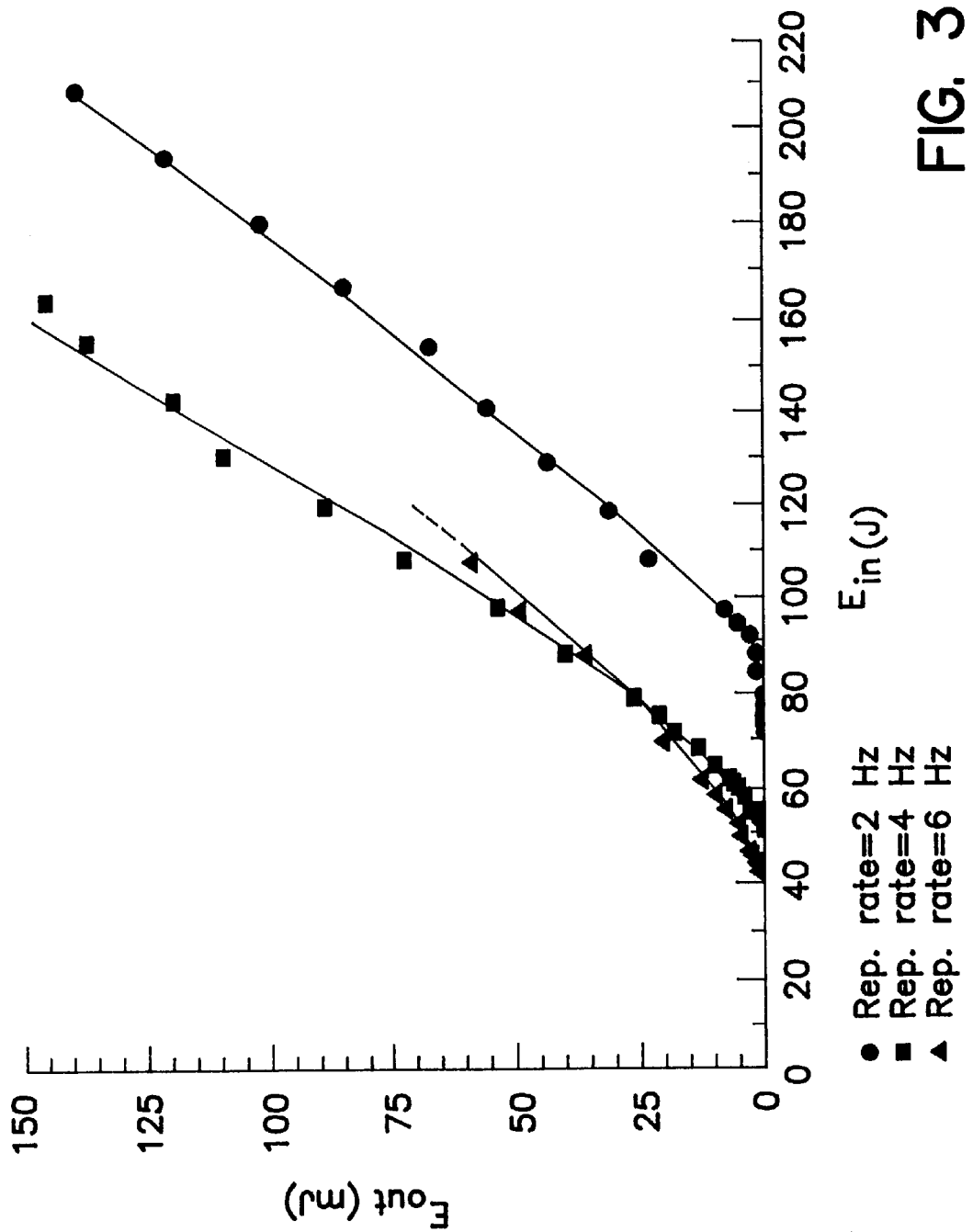
FIG. 3 shows Laser Performance of CTE:YAG: 1% Cr: 5% Tm: 30% Er, Uncoated.

Another crystal was grown to have the composition: YAG:1% Cr: 5% Tm: 30% Er. This laser rod, uncoated, lased in 2.94μ only. Output for various repetitions is shown in FIG. 3.

Figure 4:
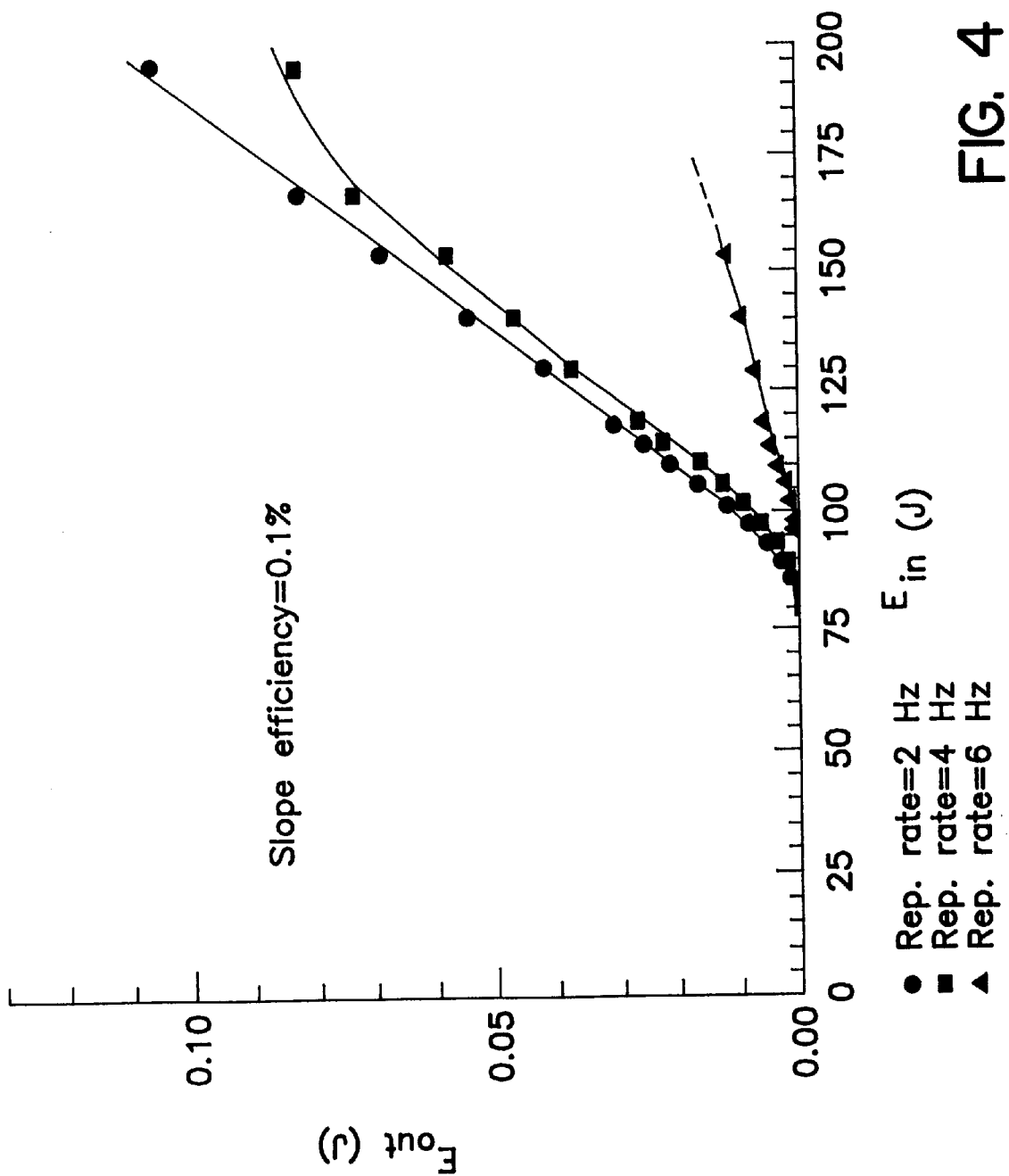
FIG. 4 shows Laser Performance of CTE:YAG: 1% Cr: 5% Tm: 30% Er, Coated.

When the above rod was antireflective coated, it produced 100 mJ of 2.7μ laser beam only. The results in graphical form are shown in FIG. 4. This Figure also shows the very negative effect of high $Er^{3+}$ concentration on performance in higher repetition rates (see the dramatic drop in output at 6 Hz).

Example 3

The next crystal composition tested was: YAG: 1% Cr: 5% Tm: 10% Er. This material lased at broadband when not coated.

| Low Pump Level (Threshold to about 50 J/pulse) | | High Pump Level (Greater than about 50 J/Pulse) | |
|---|---|---|---|
| λ (μm) | Output (mJ) | λ (μm) | Output (mJ) |
| 2.7 | 9.2 | 2.7 | 10–11 |
| 2.8 | 1.75 | 2.8 | 2 |
| 2.94 | | 2.94 | 55 |

Figure 5:
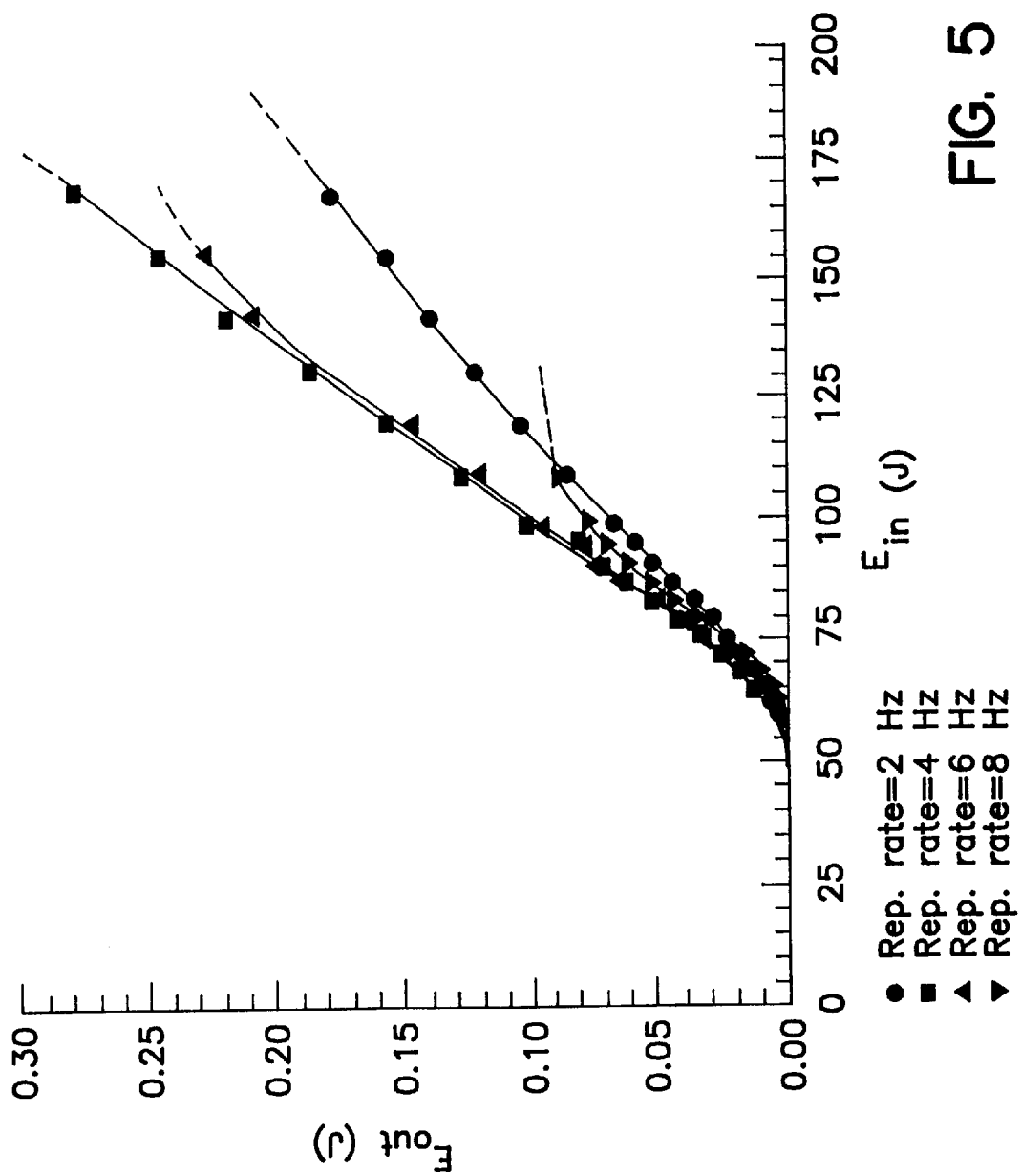
FIG. 5 shows Laser Performance of CTE:YAG: 1% Cr: 5% Tm: 10% Er, Coated.

When this rod was tested with antireflection coatings, it lased only at the desired 2.7 μm, and with a strong 300 mJ output. See FIG. 5.

Example 4

Figure 6:
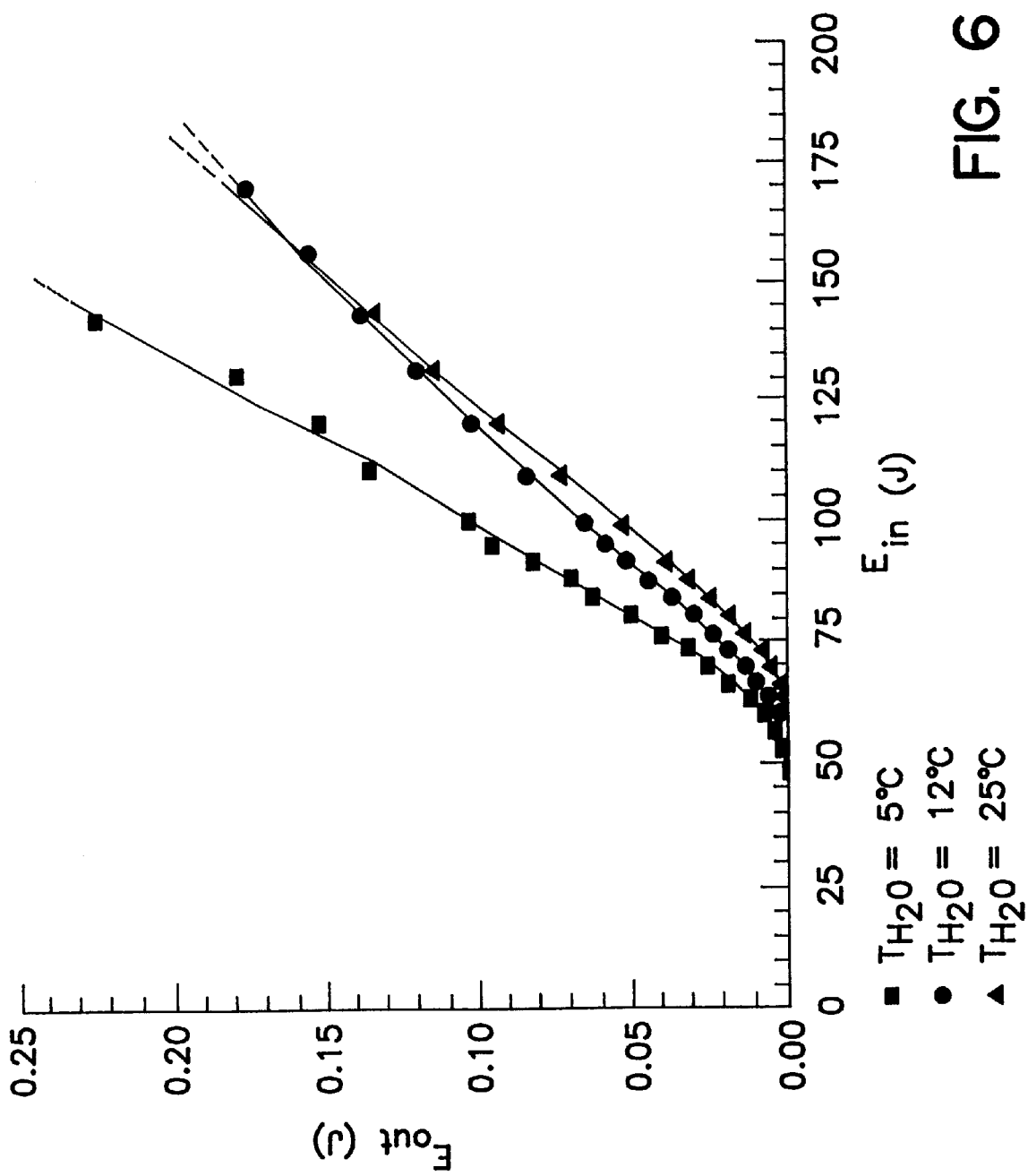
FIG. 6 shows Laser Performance of CTE:YAG: 1% Cr: 5% Tm: 10% Er, at various temperatures.

In order to verify that the difference is a result of lasing from the $X_1$ Stark level, lasing experiments were carried out using the rod of Example 2 at various temperatures, since population on Stark levels is very temperature-sensitive FIG. 6 shows a dramatic increase in output power when the laser is operated at 5° C. Without intending to be bound by any particular theory, this increase in output power supports our theory of pumping the Stark level of erbium $^4I_{11/2}$ resulting in lasing to the lowest $^4I_{13/2}$ Stark level Example 5

Figure 7:
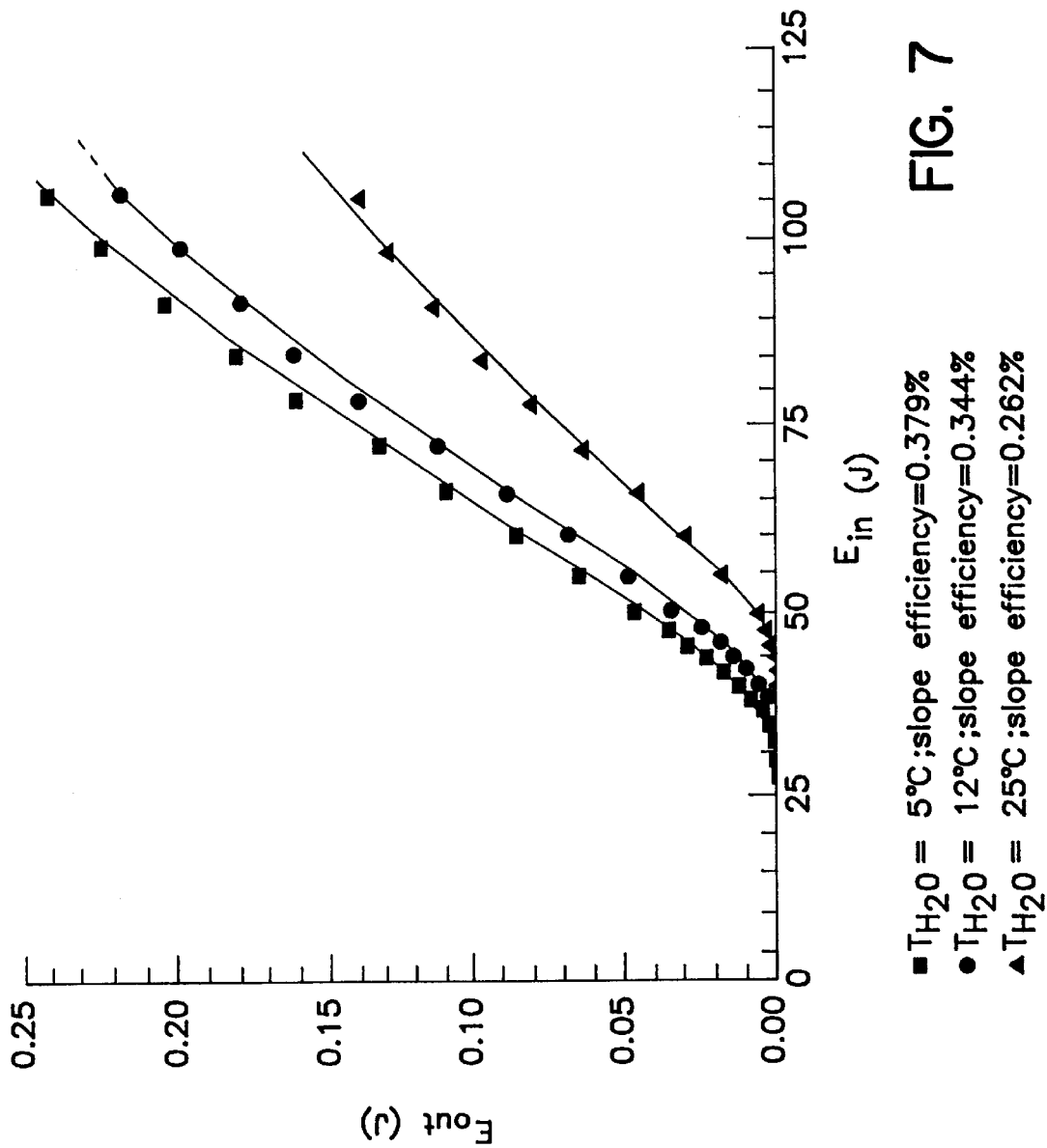
FIG. 7 shows Laser Performance of CTE:YAG at 6 Hz at various temperatures.

In this example, various power outputs were tested and compared. FIG. 7 is a comparison of 2.7μ power output versus power input in 6 Hz operation at variety of temperatures. The dramatic power out increase at 5° C. and 12° C. is again related to Stark energy level structure of $Er^{3+}$ ions, and confirms that the difference between 2.95μ and 2.7μ arises from creating population inversion on the right Stark level.

Example 6

Figure 8:
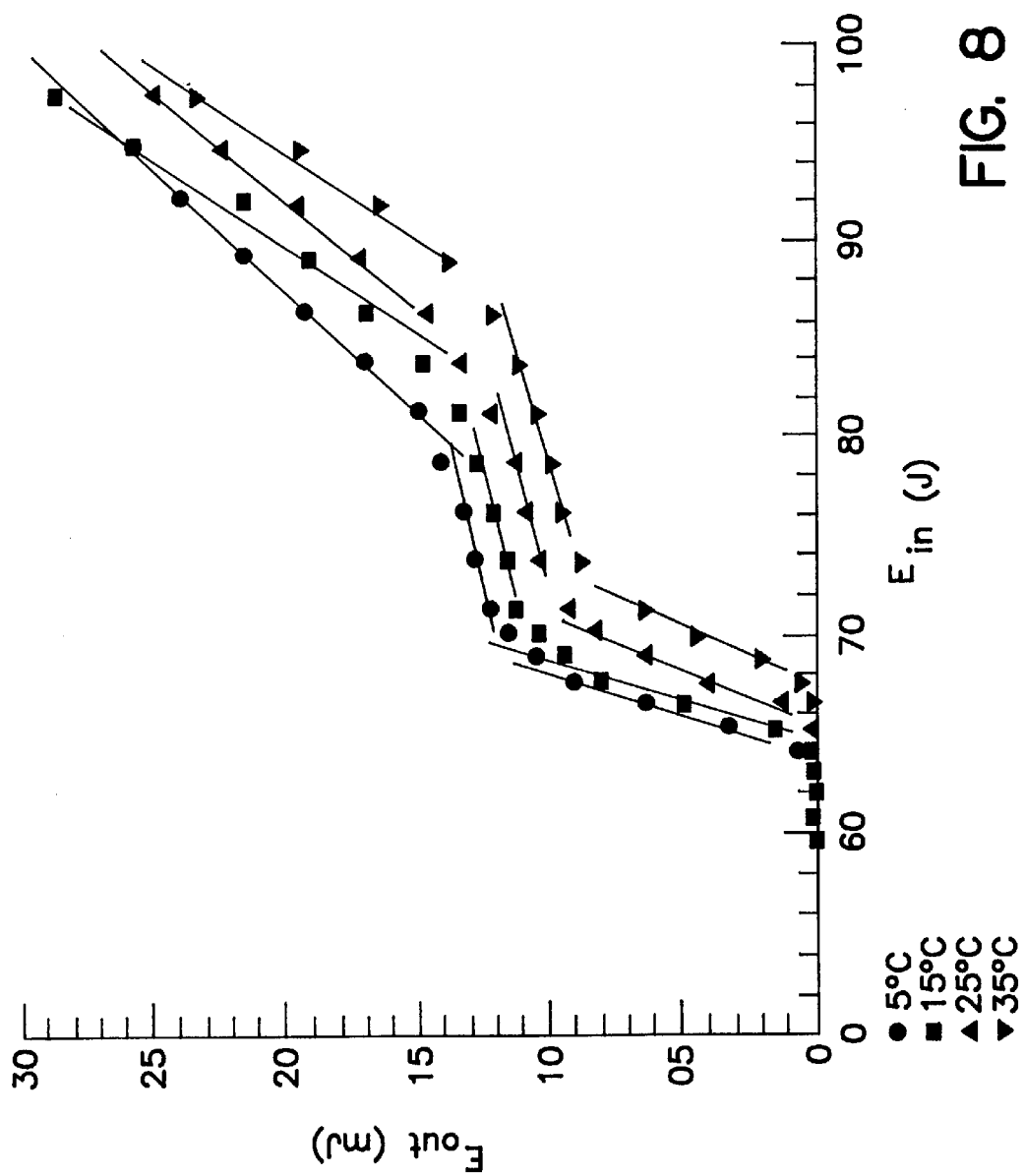
FIGS. 8, 9 and 10 show results of Q-switched Operation.
Figure 9:
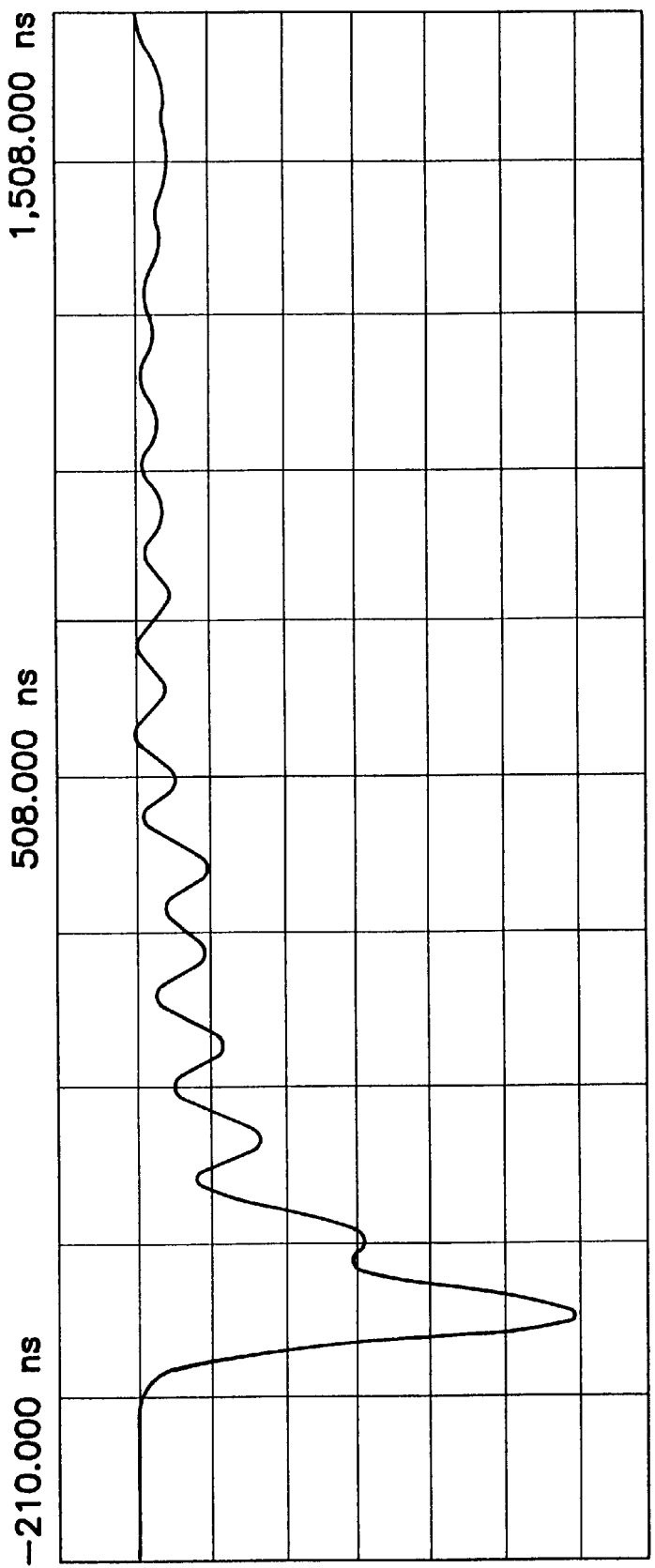
Figure 10:
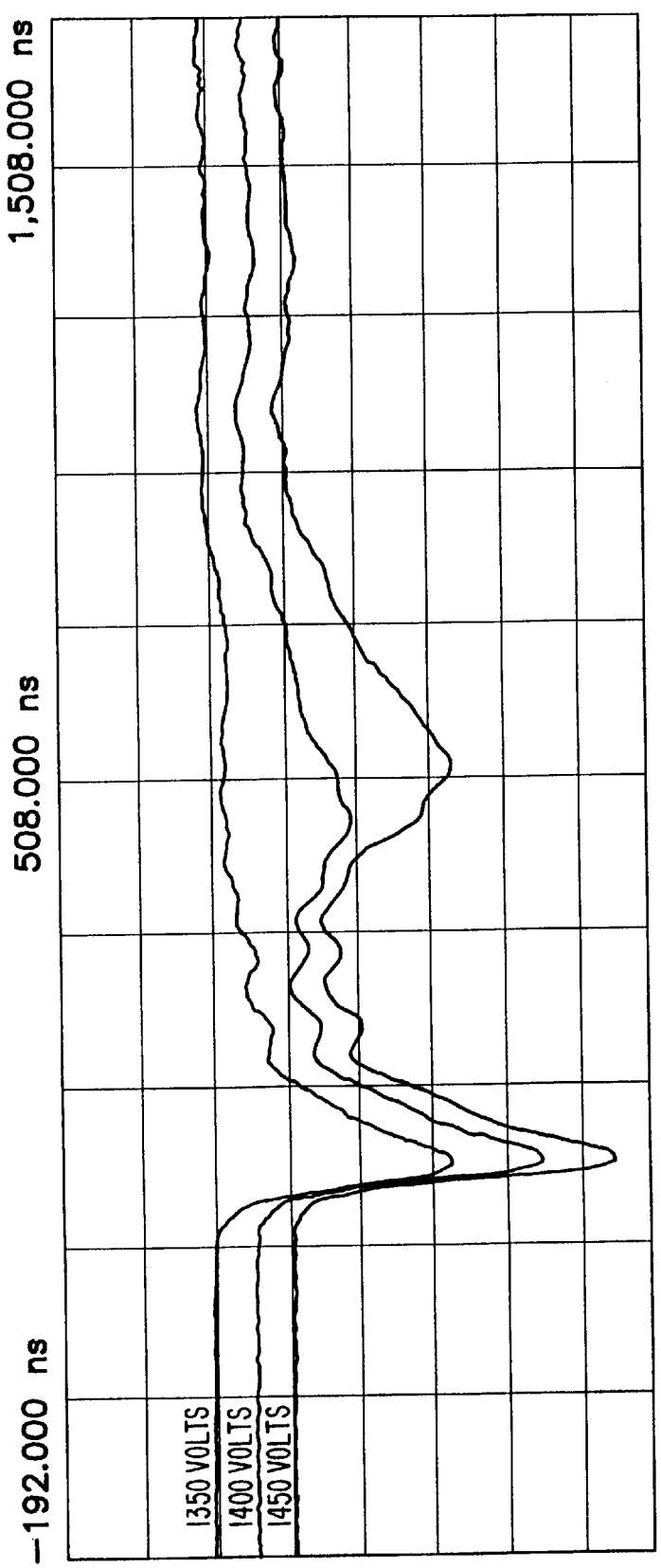

In this example, the use of Q-switching was evaluated. FIGS. 8, 9, and 10 present the results of Q-switched laser operation and provide evidence of the effect of multiple pumping channels in the system. Energy transfer rates between energy levels in different channels are not identical, and dynamics of such combined energy transfer are revealed in experiments of extremely short duration, such as the duration of a Q-switched pulse.

FIG. 8 shows differences in slope efficiencies of Q-switched pulse as function of input energy and temperature indicating several different slopes at different temperatures. The 15° C. operation actually shows four different slopes, depending on which energy transfer channel dominates.

FIG. 9 shows "ringing" of Q-switched pulse caused by competition in energy transfer mechanism of various pumping channels which can evolve into "double" pulsing at high input energy (FIG. 10).

If all channels (pumping) not involving $Cr^{3+}$ sensitizer are made efficient enough to pump the $X_1$ Stark level of Er, the Tm-Er combination in YAG or LuAG may be used also for diode-pumped (laser diode or other laser pump) 2.7μ lasers. While the compositions may not contain $Cr^{3+}$, the Er-Tm combination would be similar or identical to the one mentioned above.

We claim:

1. A Cr/Tm/Er-doped, yttrium- or lutetium-garnet host material crystal for a solid-state laser, wherein about 3 to about 8 atomic percent of the yttrium or lutetium, respectively, crystallographic sites are occupied by $Tm^{3+}$ ions, about 7 to about 22 atomic percent of the yttrium or lutetium, respectively, crystallographic sites are occupied by $Er^{3+}$ ions, and about 0.6 to about 1.6 atomic percent of the octahedral sites of the garnet structure are occupied by $Cr^{3+}$ ions, which crystal lases under the influence of a pumping means at a wavelength of no more than about 2.7μ.

2. The crystal of claim 1 wherein about 2 to about 5 percent of the yttrium or lutetium, respectively, crystallographic sites are occupied by $Tm^{3+}$ ions.

3. The crystal of claim 1 wherein about 6 to about 15 percent of the yttrium or lutetium, respectively, crystallographic sites are occupied by $Er^{3+}$ ions.

4. The crystal of claim 1 wherein about 0.5 to about 1.7 percent of the octahedral sites of the garnet are occupied by $Cr^{3+}$ ions.

5. The crystal of claim 1 wherein the host material is YAG.

6. The crystal of claim 1 wherein the host material is LuAG.

7. The crystal of claim 1 wherein the crystal is antireflective coated.

8. The crystal of claim 1 wherein the crystal is not coated.

9. The crystal of claim 1 which lases at substantially 2.7$\mu$.

10. A solid-state laser comprising the crystal of claim 1 wherein the pumping means is a flashlamp.

11. A solid-state laser comprising the crystal of claim 1 wherein the pumping means is a laser or laser diode.

12. A laser of claim 10 which operates at a temperature of about 4 to about 35° C.

13. A laser of claim 11 which operates at a temperature of about 4 to about 35° C.

14. The laser of claim 10 wherein said $Cr^{3+}$, $Tm^{3+}$ and $Er^{3+}$ doped laser crystal is responsive to light from said flashlamp means for simultaneously absorbing that light in $^4T_2$ and $^4T_1$ levels of said $Cr^{3+}$ ions, $^3F_3$ level of said $Tm^{3+}$ ions, and $^4F_{4/2}$ level of the $Er^{3+}$ ions, resulting in a nonradiative simultaneous transfer of the excitation from the thermally mixed $^4T_2/^2E$ level of $Cr^{3+}$ to $^3F_3$ levels of said $Tm^{3+}$ ion and $^4F_{9/2}$ levels of $Er^{3+}$ ions, from $^3F_3$ $Tm^{3+}$ level, and the excitation combined with pump energy directly deposited to $^3F_3$ simultaneously relaxes to $^3H_4$ $Tm^{3+}$ level from which the combined energy transfers to $^4I_{9/2}$ level of $Er^{3+}$ ion and this energy from $^4I_{9/2}$ relaxes to $X_2$ level of $^4F_{11/12}$ manifold, and is added to energy transferred from $^4I_{9/2}$ of Er, thus creating a massive population inversion on $X_2$ Stark level enabling the crystal to lase at laser transition from $X_2$ Stark level of $^4I_{11/2}$ level to $Y_1$ Stark level of $^4I_{13/2}$ level of $Er^{3+}$ ion to produce emission over about 50 mJ/pulse at 2.69 microns.

\* \* \* \* \*